United States Patent
Sato et al.

(10) Patent No.: US 11,772,196 B2
(45) Date of Patent: Oct. 3, 2023

(54) METHOD FOR PRODUCING SHAPED ARTICLE AND SHAPED ARTICLE

(71) Applicant: KOBE STEEL, LTD., Hyogo (JP)

(72) Inventors: Shinji Sato, Hyogo (JP); Takeshi Yamada, Hyogo (JP); Takemasa Yamasaki, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 497 days.

(21) Appl. No.: 16/970,465

(22) PCT Filed: Mar. 8, 2019

(86) PCT No.: PCT/JP2019/009276
§ 371 (c)(1),
(2) Date: Aug. 17, 2020

(87) PCT Pub. No.: WO2019/176759
PCT Pub. Date: Sep. 19, 2019

(65) Prior Publication Data
US 2020/0376601 A1    Dec. 3, 2020

(30) Foreign Application Priority Data

Mar. 16, 2018 (JP) ................................ 2018-050029

(51) Int. Cl.
*B23K 26/342*    (2014.01)
*B33Y 10/00*    (2015.01)
(Continued)

(52) U.S. Cl.
CPC .......... *B23K 26/342* (2015.10); *B23K 26/354* (2015.10); *B33Y 10/00* (2014.12); *B33Y 40/20* (2020.01)

(58) Field of Classification Search
CPC .... B23K 26/342; B23K 26/354; B33Y 10/00; B33Y 40/20
(Continued)

(56) References Cited

U.S. PATENT DOCUMENTS

| 4,903,888 A | * | 2/1990 | Clark | B23K 26/32 |
| | | | | 219/121.45 |
| RE35,756 E | * | 3/1998 | Schneebeli | B23K 35/001 |
| | | | | 228/119 |

(Continued)

FOREIGN PATENT DOCUMENTS

| CN | 111417486 A | 7/2020 |
| CN | 111770806 A | 10/2020 |

(Continued)

OTHER PUBLICATIONS

Stosic et al. (Screw Compressors, Mathematical Modelling and Performance Calculations, 2005). (Year: 2005).*

(Continued)

*Primary Examiner* — Erin McGrath
(74) *Attorney, Agent, or Firm* — Studebaker & Brackett PC

(57) ABSTRACT

In the present application, a shaped article W is produced, the shaped article including: a plurality of blades provided around a shaft, with an interval disposed therebetween in the circumferential direction; and curved surface-shaped recesses present in between the blades. This method for producing a shaped article includes: a shaping step, in which welding beads where filler material has been melted and solidified at the peripheral surface are layered on a base material having a circular cross-section of a greater radius than the bottom circle that passes through the lowest part of the recess, thus forming a shaped section that will become a blade; and a cutting step in which part of the surface of the shaped section and the peripheral surface of the base mate- (Continued)

rial is cut to form a blade, and the recesses between the blades are also formed.

6 Claims, 10 Drawing Sheets

(51) Int. Cl.
*B23K 26/354* (2014.01)
*B33Y 40/20* (2020.01)

(58) Field of Classification Search
USPC ....................................................... 219/76.14
See application file for complete search history.

(56) References Cited

U.S. PATENT DOCUMENTS

| | | |
|---|---|---|
| 2016/0123327 A1 | 5/2016 | Collins et al. |
| 2020/0282497 A1 | 9/2020 | Yamasaki et al. |
| 2021/0114112 A1 | 4/2021 | Yamasaki et al. |

FOREIGN PATENT DOCUMENTS

| | | | |
|---|---|---|---|
| JP | 2017121656 A * | 7/2017 | |
| WO | 2016149774 A1 | 9/2016 | |
| WO | WO-2016149774 A1 * | 9/2016 | ............ B22F 3/1055 |

OTHER PUBLICATIONS

Kapil et al. (Solid Freeform Fabrication Conference 2017). (Year: 2017).*

Kapil Sajan et al.; "5-Axis Slicing Methods for Additive Manufacturing Process"; Dec. 31, 2017 (Dec. 31, 2017); pp. 1886-1896; XP055856134; URL:http://utw10945.utweb.utexas.edu/sites/default/files/2017/Manuscripts/5AxisSlicingMethodsforAdditiveManufacturing.pdf. [retrieved on Oct. 28, 2021].

The extended European search report issued by the European Patent Office dated Nov. 9, 2021, which corresponds to European Patent Application No. 19766841.1-1103 and is related to U.S. Appl. No. 16/970,465.

* cited by examiner

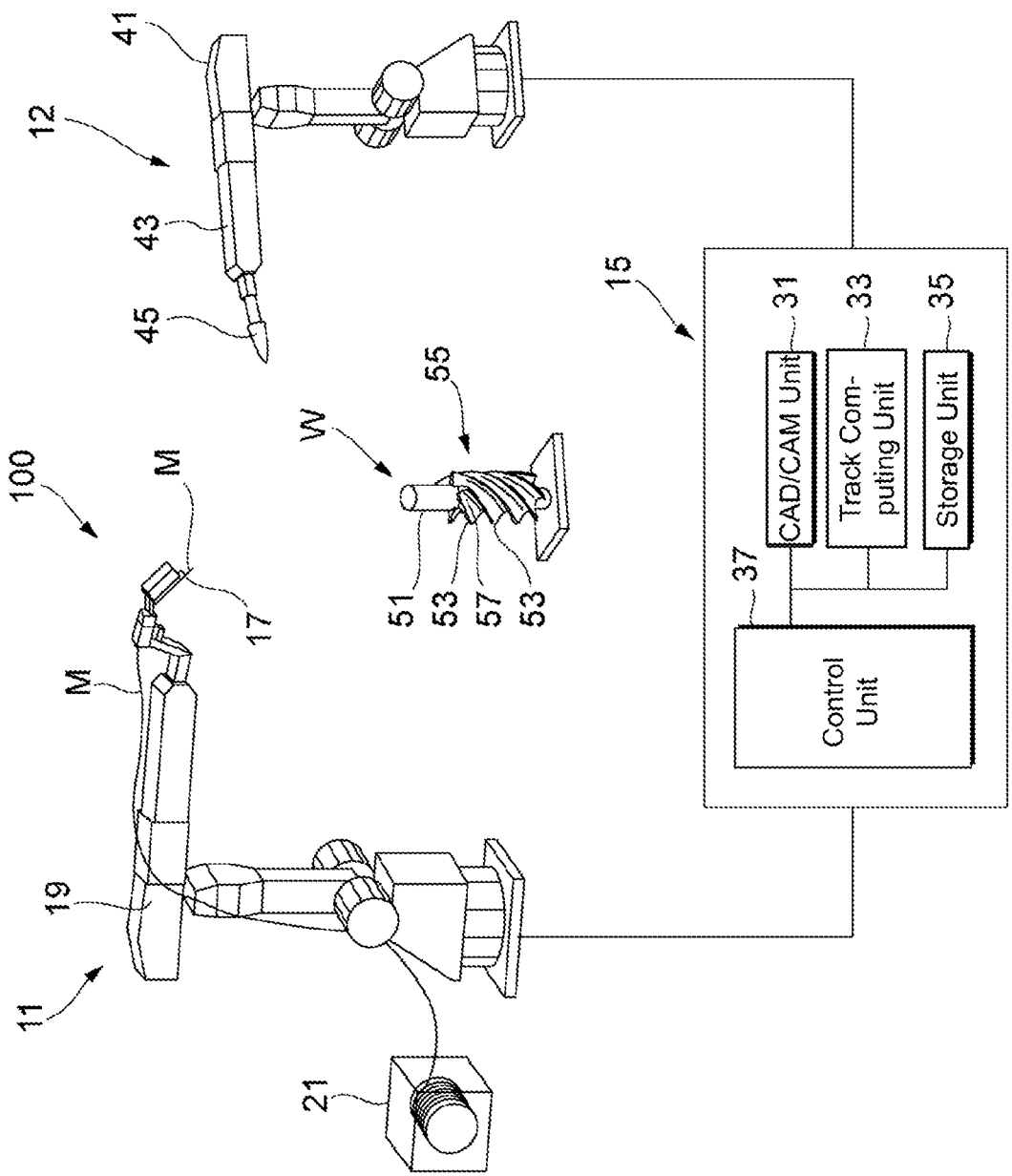

METHOD FOR PRODUCING SHAPED ARTICLE AND SHAPED ARTICLE

TECHNICAL FIELD

The present invention relates to a method for manufacturing a built-up object, and a built-up object.

BACKGROUND ART

In recent years, a need for building using a 3D printer as a manufacturing means grows. Researches and developments have been made toward practical applications of building using a metal material. A 3D printer for building using a metal material manufactures a built-up object by melting a metal powder or a metal wire by use of a heat source such as a laser or an electron beam or another heat source such as an arc, and depositing the molten metal.

For example, in a common technique for manufacturing a rotary member such as an impeller or a rotor provided in a fluid machine such as a pump or a compressor, beads are deposited on a surface of a base material serving as a hub so as to build built-up portions serving as a plurality of blades, and the built-up portions are then cut to form the blades (for example, see Patent Literature 1).

CITATION LIST

Patent Literature

Patent Literature 1: WO 2016/149774 A1

SUMMARY OF INVENTION

Technical Problem

The aforementioned manufacturing technique can increase the yield and shorten the manufacturing time, as compared with cutting from a material. In addition, as compared with casting for manufacturing using a combination of complicated casting molds, the aforementioned manufacturing technique can remove burrs generated in the combined portion of the casting molds or can prevent a failure in manufacturing caused by misalignment of the casting molds.

In a rotary member of a fluid machine, a concave portion having a curved shape is formed between blades in order to reduce fluid resistance. Thus, a root portion of each blade is formed to have a gentle curved shape. Accordingly, weld beads are formed over a wide region in the root portion of the blade so that the gentle curved shape can be formed by cutting. Thus, the number of passes of a torch for forming the weld beads increases. Therefore, time necessary for building a built-up portion by forming the weld beads increases. In addition, most of the formed weld beads are cut out in the gentle curved part of the root portion of the blade. Thus, wasted man-hours or materials increase.

An object of the present invention is to provide a method for manufacturing a built-up object, in which a built-up object having a portion with a curved shape can be manufactured without waste and with high accuracy and in which manufacturing time can be reduced as much as possible, and a built-up object manufactured thus.

Solution to Problem

The present invention includes the following configurations.

(1) A method for manufacturing a built-up object, in which the built-up object includes a plurality of blades provided around a shaft body at circumferential intervals, and concave portions provided between adjacent ones of the blades, each of the concave portions having a curved shape in a section perpendicular to an axial direction, the method including:
a building step of depositing weld beads obtained by melting and solidifying a filler material on a circumferential surface of a base material having a circular shape in a sectional view and having a larger radius than a bottom portion circle passing through bottom portions of the concave portions, thereby forming built-up portions to serve as the blades; and
a cutting step of cutting parts of surfaces of the built-up portions and the circumferential surface of the base material, thereby forming the blades and the concave portions between the blades.

(2) A built-up object including a shaft body, a plurality of blades provided around the shaft body at circumferential intervals, and concave portions provided between adjacent ones of the blades, each of the concave portions having a curved shape in a section perpendicular to an axial direction,
in which the blades are formed out of built-up portions formed by depositing weld beads obtained by melting and solidifying a filler metal,
in which parts of the shaft body in the concave portions are cut together with the built-up portions.

Advantageous Effects of Invention

In the present invention, a built-up object having a portion with a curved shape can be manufactured without waste and with high accuracy, and manufacturing time can be reduced as much as possible.

BRIEF DESCRIPTION OF DRAWINGS

FIG. 2 is a schematic configuration diagram schematically showing a manufacturing system for manufacturing the built-up object.

DESCRIPTION OF EMBODIMENTS

Embodiments of the present invention will be described in detail below with reference to the drawings.

Figure 1A:
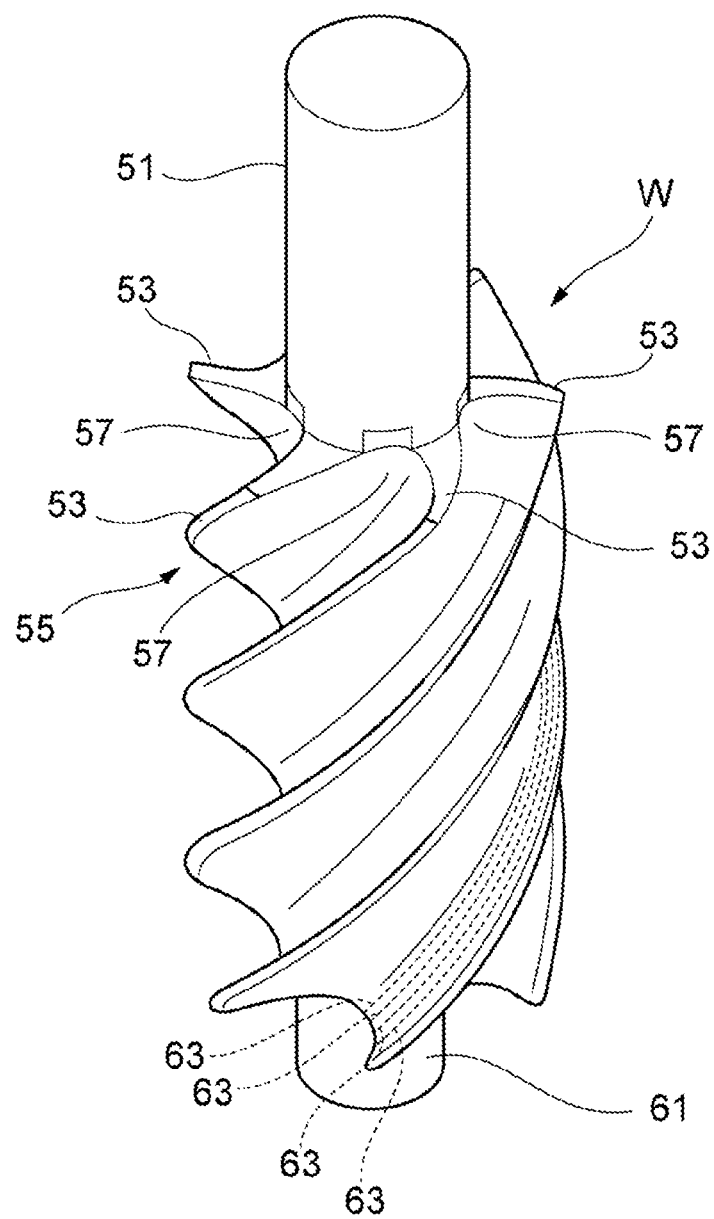
FIG. 1A is a perspective view of a rotor which is a built-up object to be manufactured by a manufacturing method in the present invention.
Figure 1B:
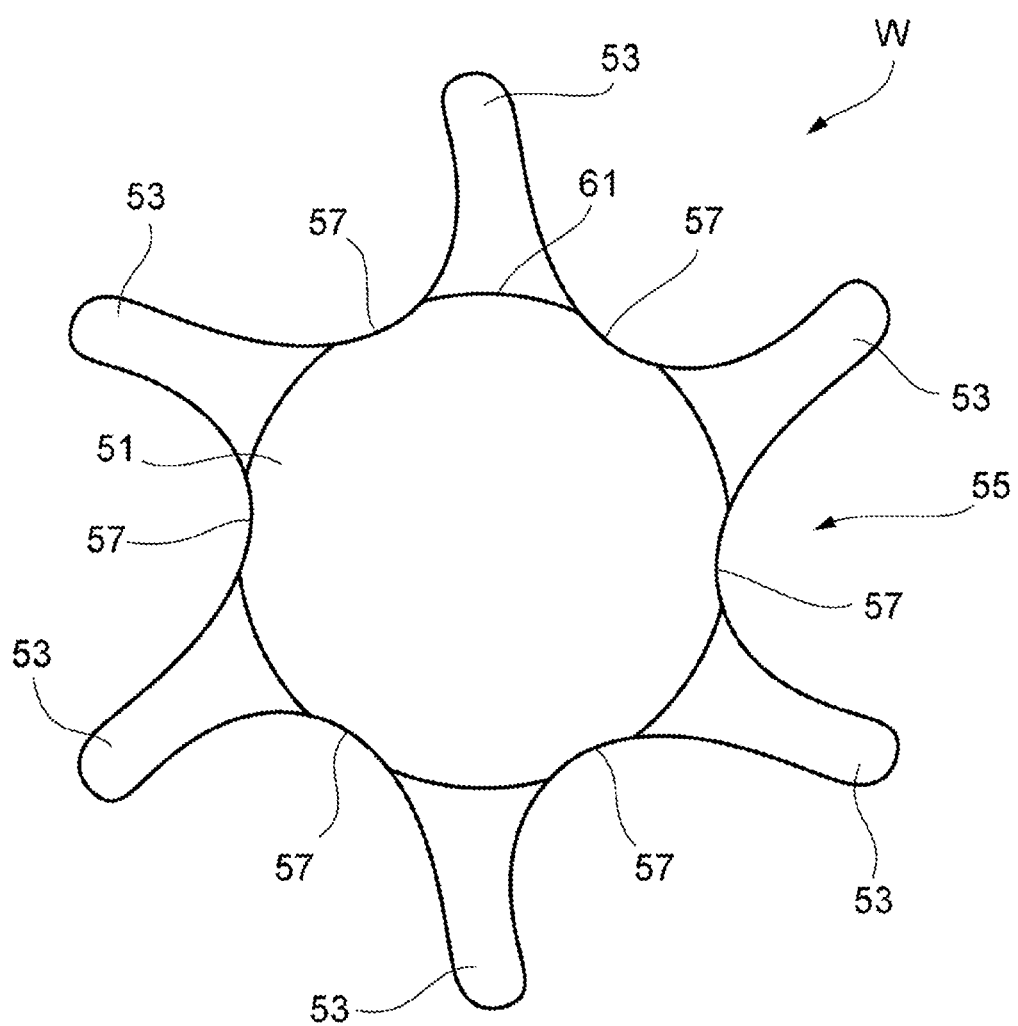
FIG. 1B is a sectional view orthogonal to an axial direction of the rotor which is a built-up object to be manufactured by the manufacturing method in the present invention.

FIG. 1A and FIG. 1B are views showing a rotor which is a built-up object to be manufactured by a manufacturing method in the present invention. FIG. 1A is a perspective view of the rotor, and FIG. 1B is a sectional view orthogonal to an axial direction of the rotor.

As shown in FIG. 1A and FIG. 1B, a built-up object W to be manufactured by the manufacturing method according to the embodiment has a columnar shaft body 51, and a plurality (six in the illustrated example) of spiral blades 53 protruding radially outward from the outer circumference of the shaft body 51. The built-up object W is, for example, a rotor 55 to be provided in a fluid machine such as a compressor.

The rotor 55 has a screw shape in which the plurality of blades 53 are provided circumferentially at equal intervals in an intermediate portion in an axial direction of the shaft body 51. The rotor 55 has concave portions 57 between adjacent ones of the blades 53. Each of the concave portions 57 has a curved shape recessed like a U-shape in section perpendicular to the axial direction.

The rotor 55 is obtained in the following manner. Weld beads 63 to serve as the blades 53 are formed and deposited on a circumferential surface of a rod-like base material 61 to serve as the shaft body 51. After that, the weld beads 63 and the base material 61 are cut by cutting processing to form the blades 53 and the concave portions 57 between the blades 53.

Next, a manufacturing system for manufacturing the built-up object W which is the rotor 55.

FIG. 2 is a schematic configuration diagram schematically showing the manufacturing system for manufacturing the built-up object.

As shown in FIG. 2, a manufacturing system 100 has a deposition building unit 11, a cutting unit 12, and a controller 15 for integrally controlling the deposition building unit 11 and the cutting unit 12.

The deposition building unit 11 includes a welding robot 19 having a torch 17 provided on a tip shaft thereof, and a filler metal feeding unit 21 for feeding a filler metal (weld wire) M to the torch 17. The torch 17 retains the filler metal M in a state where the filler metal M projects from the tip thereof.

The welding robot 19 is an articulated robot, and in the torch 17 provided on the tip shaft, the filler metal M is supported such that it can be continuously fed. The position or posture of the torch 17 can be set three-dimensionally desirably within the range of the degree of freedom of the robot arm.

The torch 17 includes a not-shown shield nozzle, and a shielding gas is supplied from the shield nozzle. The arc welding method used in this configuration may be either a consumable electrode type such as shielded metal arc welding or carbon dioxide gas arc welding, or a non-consumable electrode type such as TIG welding or plasma arc welding. The arc welding method is appropriately selected depending on the built-up object W to be manufactured.

For example, in the case of the consumable electrode type, a contact tip is disposed inside the shield nozzle, and the filler metal M to which a melting current is to be supplied is held on the contact tip. The torch 17 generates an arc from the tip of the filler metal M in a shielding gas atmosphere while holding the filler metal M. The filler metal M is fed from the filler metal feeding unit 21 to the torch 17 by a not-shown delivery mechanism attached to the robot arm, etc. Then, the filler metal M fed continuously is melted and solidified while the torch 17 is moved, so that linear weld beads 63 which are melt-solidified bodies of the filler metal M are formed on a base material 61 described later (see FIG. 1A and FIG. 1B).

The heat source for melting the filler metal M is not limited to the aforementioned arc. A heat source using another system such as a heating system using an arc and a laser together, a heating system using a plasma or a heating system using an electron beam or a laser may be used. In the case of heating by an electron beam or a laser, a heating amount can be controlled more finely to keep each weld bead in a more proper state, thereby contributing to further improvement of the quality of the built-up object W.

Any commercially available weld wire can be used as the filler metal M. For example, wires provided as MAG welding and MIG welding solid wires (JIS Z 3312) for mild steel, high tensile steel and cryogenic steel, and arc welding flux cored wires (JIS Z 3313) for mild steel, high tensile steel and cryogenic steel can be used as the filler metal M.

The cutting unit 12 includes a cutting robot 41. The cutting robot 41 is an articulated robot, like the welding robot 19. The cutting robot 41 is, for example, provided with a metal processing tool 45 such as an end mill or a grinding stone in a tip portion of a tip arm 43. Thus, the cutting robot 41 can be moved three-dimensionally by the controller 15 so that the cutting robot 41 can take a desired processing posture.

The cutting robot 41 cuts, with the metal processing tool 45, the built-up object W where the weld beads 63 (see FIG. 1A) have been deposited on the base material 61 by the welding robot 19 of the deposition building unit 11. Thus, the built-up object W is processed into the rotor 55.

The controller 15 has a CAD/CAM unit 31, a track computing unit 33, a storage unit 35, and a control unit 37 to which those units are connected.

The CAD/CAM unit 31 generates shape data of the built-up object W to be manufactured, and then slices the shape data into a plurality of layers to generate layer shape data expressing a shape of each layer. The track computing unit 33 determines a moving locus of the torch 17 based on the produced layer shape data. In addition, the track computing unit 33 determines a moving locus of the metal processing tool 45 based on the shape data. The storage unit 35 stores data such as the shape data of the built-up object W, the produced layer shape data, the moving locus of the torch 17, the moving locus of the metal processing tool 45, etc.

The control unit 37 executes a driving program based on the layer shape data or the moving locus of the torch 17 stored in the storage unit 35, thereby driving the welding robot 19. That is, in response to an instruction from the controller 15, the welding robot 19 moves the torch 17 while melting the filler metal M with an arc, based on the moving locus of the torch 17 produced by the track computing unit 33. In addition, the control unit 37 executes a driving program based on the shape data or the moving locus of the metal processing tool 45 stored in the storage unit 35, thereby driving the cutting robot 41. Thus, the built-up object W is subjected to cutting processing by the metal processing tool 45 provided in the tip arm 43 of the cutting robot 41. FIG. 2 shows a state in which the weld beads 63 to serve as the blades 53 are formed spirally on the circumferential surface of the columnar base material 61 having a circular shape in sectional view and erectly provided in a vertical direction, so as to build the built-up object W, and then the built-up object W is subjected to cutting processing.

Next, a method for manufacturing a built-up object according to the embodiment will be described.

Figure 3A:
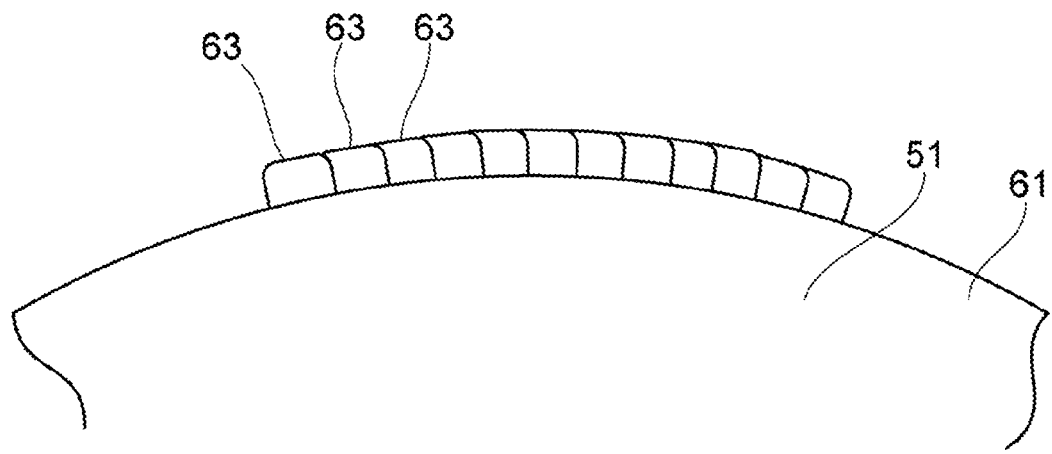
FIG. 3A is a schematic sectional view of a part of a rotor for illustrating a deposition step in a method for manufacturing a built-up object in an embodiment of the present invention.
Figure 3B:
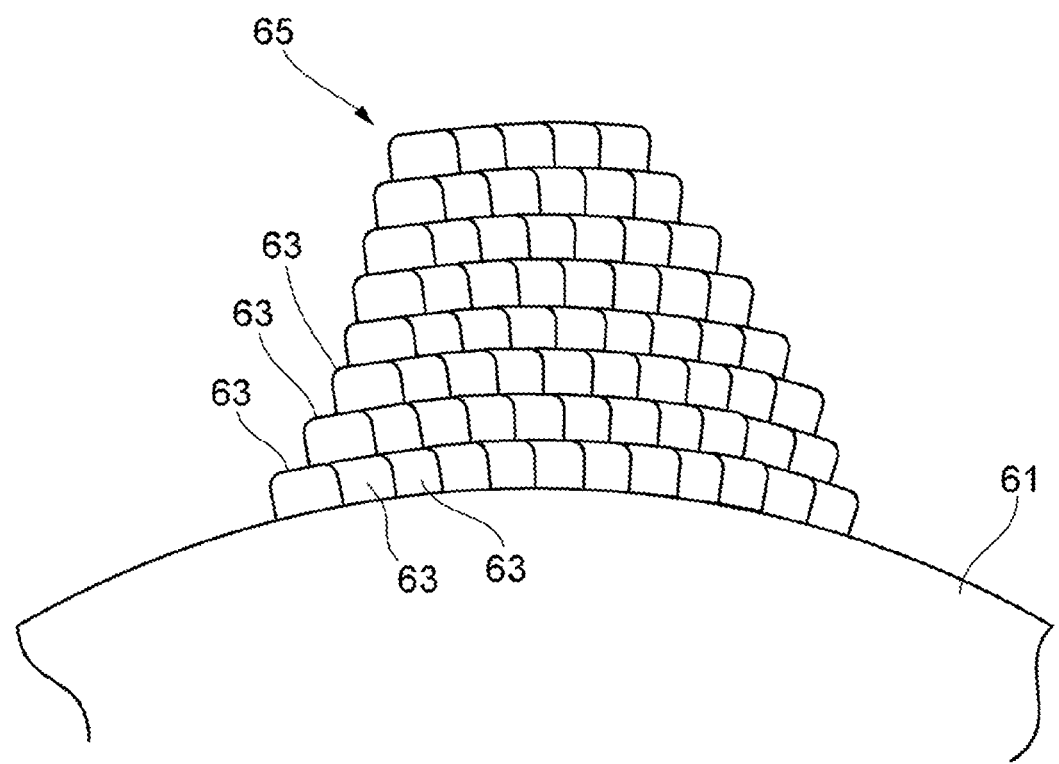
FIG. 3B is a schematic sectional view of a part of the rotor for illustrating the deposition step in the method for manufacturing a built-up object in the embodiment.
Figure 4A:
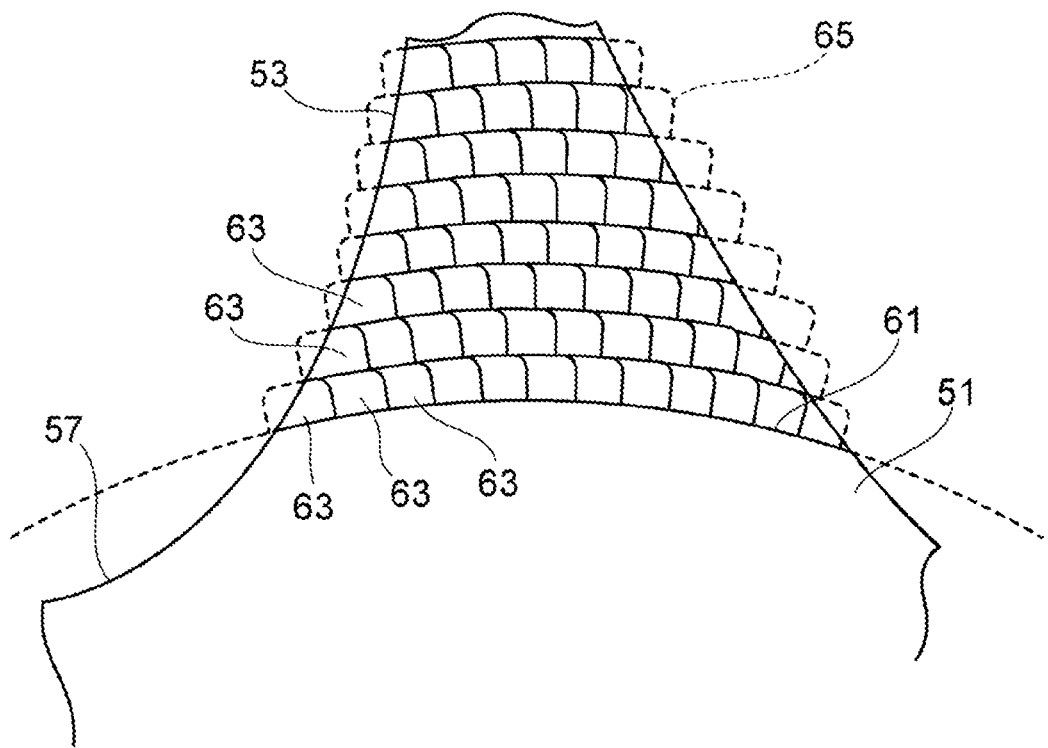
FIG. 4A is a schematic sectional view of a part of the rotor for illustrating a cutting step in the method for manufacturing a built-up object in the embodiment.
Figure 4B:
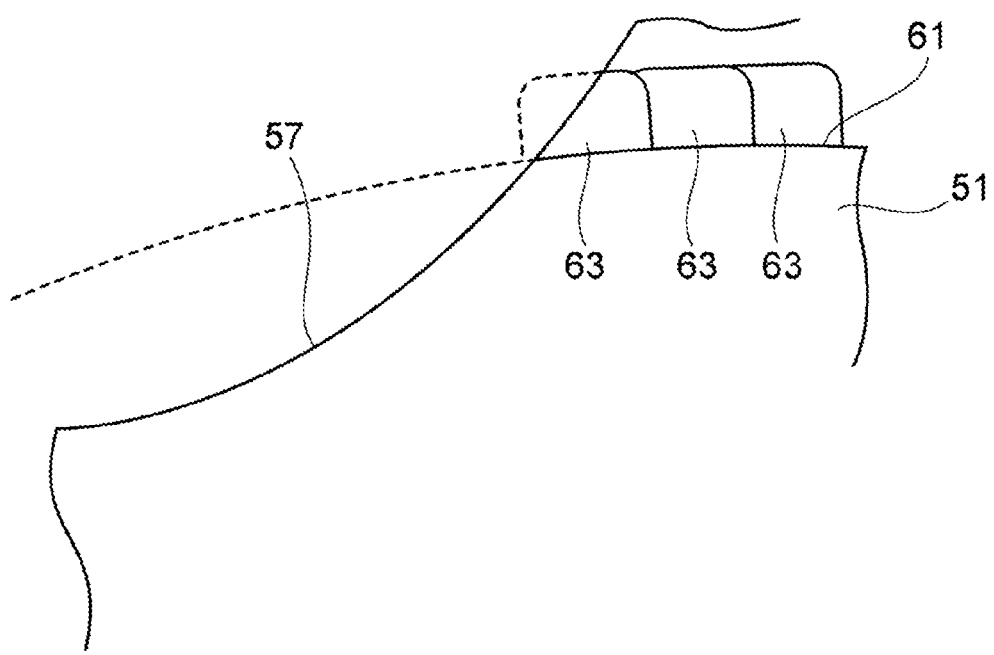
FIG. 4B is a schematic enlarged sectional view of a part of the rotor for illustrating the cutting step in the method for manufacturing a built-up object in the embodiment.

FIG. 3A and FIG. 3B are views for illustrating a deposition step in the method for manufacturing a built-up object according to the embodiment. Each of FIG. 3A and FIG. 3B is a schematic sectional view of a part of a rotor. FIG. 4A and FIG. 4B are views for illustrating a cutting step in the method for manufacturing a built-up object according to the embodiment. FIG. 4A is a schematic sectional view of a part of the rotor, and FIG. 4B is a schematic enlarged sectional view of a part of the rotor.

(Building Step)

As shown in FIG. 3A, the columnar base material 61 having a circular shape in sectional view to serve as the shaft body 51 is set in the manufacturing system 100 shown in FIG. 2. Next, the welding robot 19 is driven to move the torch 17 of the deposition building unit 11 along the moving locus of the torch 17 generated based on the set layer shape data while the filler metal M is melted, and the molten filler metal M is fed to the circumferential surface of the base material M. Thus, a plurality of weld beads 63 are formed spirally on the circumferential surface of the base material 61. After that, as shown in FIG. 3B, on the formed layer of the weld beads 63, weld beads 63 are further deposited sequentially to manufacture a built-up object W including built-up portions 65 to serve as the blades 53 shown in FIG. 1A and FIG. 1B.

(Cutting Step)

The cutting robot 41 shown in FIG. 2 is driven to cut the built-up object W with the metal processing tool 45. Thus, as shown in FIG. 4A and FIG. 4B, the surfaces of the built-up portions 65 and parts of the base material 61 are cut to form the blades 53 and form the concave portions 57 between the blades 53. In this manner, the rotor 55 having the plurality of blades 53 on the outer circumference of the columnar shaft body 51 is formed.

Here, in the embodiment, the cutting dimension of the base material 61 to serve as the shaft body 51 and the radius of the base material 61 to be selected are set as follows.

Figure 5:
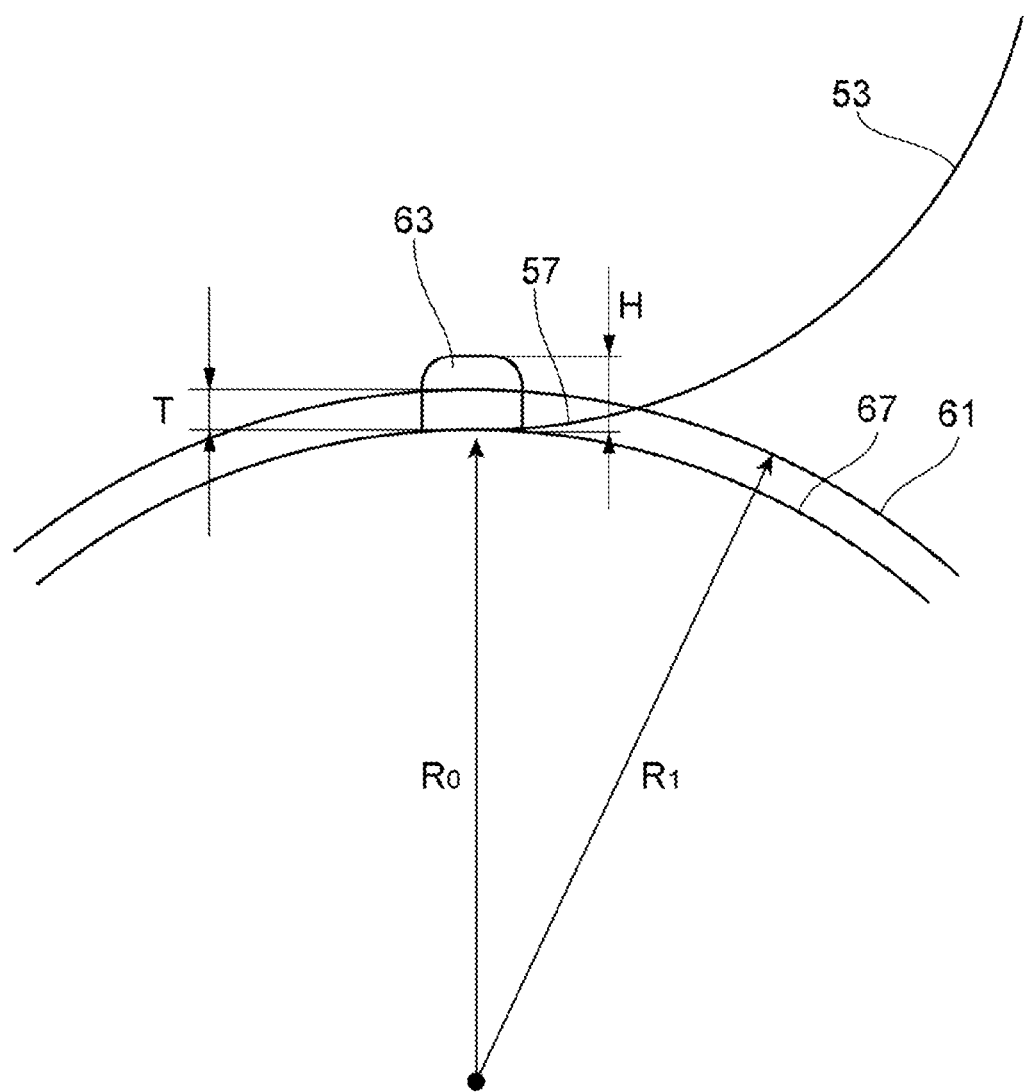
FIG. 5 is a schematic view for illustrating a cutting dimension of a base material and setting of a radius of the base material to be selected.

FIG. 5 is a schematic view for illustrating the cutting dimension of the base material and the setting of the radius of the base material to be selected.

As shown in FIG. 5, a maximum cutting dimension T is set to satisfy the following relationship (1) where H designates the height of each bead 63 and T designates the maximum cutting dimension in the radial direction of the base material 61.

$$T \geq \tfrac{1}{2} H \quad (1)$$

In addition, the radius R1 of the base material 61 is set to satisfy the following relationship (2) where R0 designates the radius of a bottom portion circle 67 passing through the bottom portions of the concave portions 57, and R1 designates the radius of the base material 61.

$$R1 \geq R0 + H \quad (2)$$

Based on the maximum cutting dimension T and the radius R1 of the base material 61 set from the aforementioned relationships (1) and (2), the base material 61 is selected and the shape data of the built-up object W to be built is generated.

Here, a method for manufacturing a built-up object according to a reference example will be described.

Figure 6A:
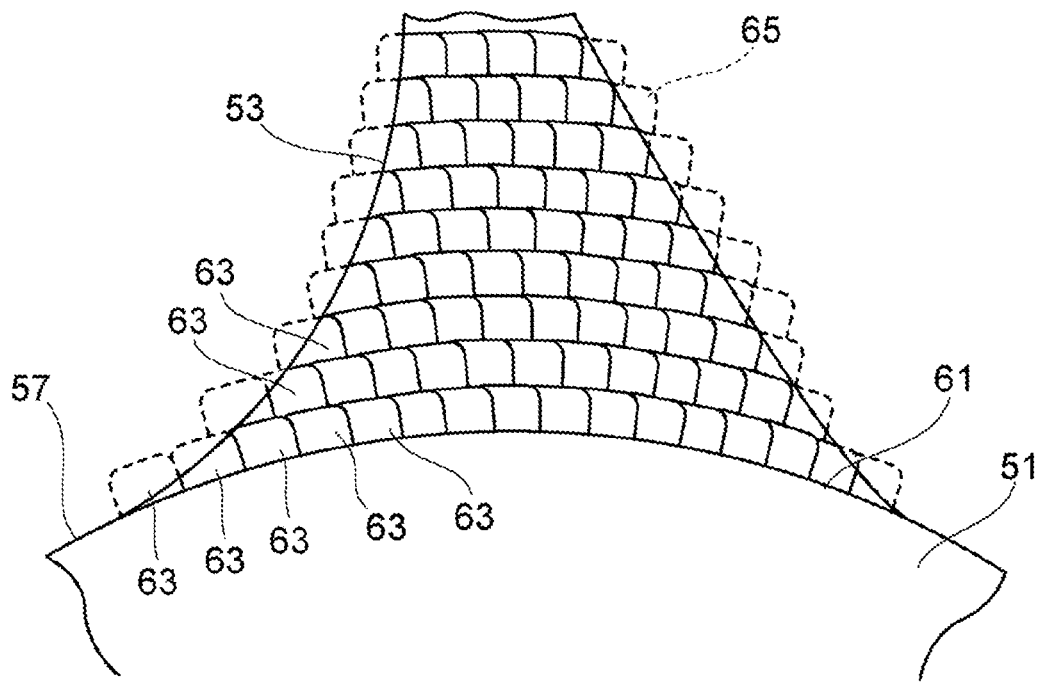
FIG. 6A is a schematic sectional view of a part of a rotor for illustrating a cutting step in a method for manufacturing a built-up object in a reference example.
Figure 6B:
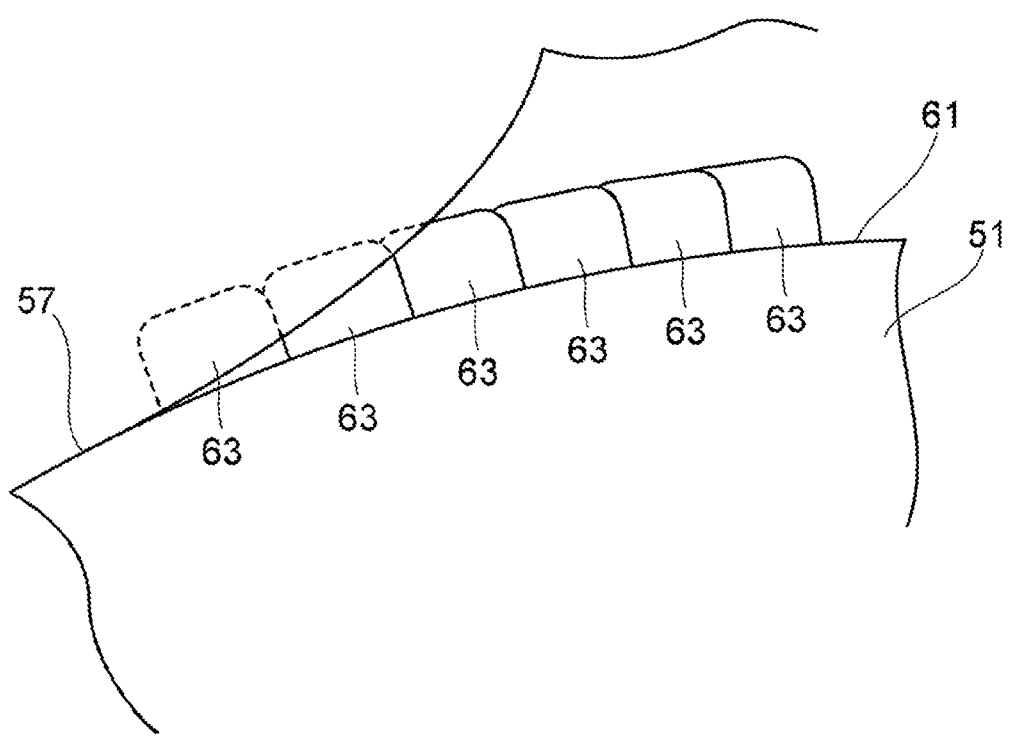
FIG. 6B is a schematic enlarged sectional view of a part of the rotor for illustrating the cutting step in the method for manufacturing a built-up object in the reference example.

FIG. 6A and FIG. 6B are views for illustrating a cutting step in the method for manufacturing a built-up object according to the reference example. FIG. 6A is a schematic sectional view of a part of a rotor, and FIG. 6B is a schematic enlarged sectional view of a part of the rotor.

As shown in FIG. 6A and FIG. 6B, in the reference example, the radius R1 of the base material 61 to be selected is made as large as the radius R0 of the bottom portion circle 67 passing through the bottom portions of the concave portions 57 of the rotor 55 to be manufactured. In this case, in the cutting step, the base material 61 is not cut, but only the built-up portions 65 configured by the weld beads 63 are cut.

In this manner, in the case where the base material 61 is not cut, the weld beads 63 must be formed in a wide region in order to form a root portion having a gentle curved shape in each blade 53. In addition, in the gentle curved part near the bottom portion of the concave portion 57, most of weld beads 63 must be cut, resulting in great waste. For example, near the bottom portion of the concave portion 57, the upper half or more of the weld bead 63 must be cut, resulting in waste.

On the other hand, in the method for manufacturing a built-up object according to the embodiment, a part of the base material 61 is cut for forming each concave portion 57 (see FIG. 4A and FIG. 4B). Accordingly, the region where the weld beads 63 are formed in order to form a root portion having a gentle curved shape in the blade 53 can be made as narrow as possible. As a result, the number of passes of the torch 17 forming the weld beads 63 can be reduced to shorten the time required for the building step. In addition, the welding amount of the weld beads 63 can be reduced so that the lowering of the accuracy caused by welding deformation due to a large welding amount of the weld beads 63 can be inhibited to improve the accuracy.

In addition, the weld beads 63 formed in the gentle portion of the concave portion 57 can be minimum. Thus, the waste caused by cutting of a large part of the weld beads 63 can be reduced as much as possible (see FIG. 4B).

In addition, the embodiment satisfies $T \geq \tfrac{1}{2} H$ where H designates the height of the weld bead 63 and T designates the maximum cutting dimension in the radial direction of the base material 61. Accordingly, in the cutting step, the cutting amount of the weld beads 63 formed on the base material 61 can be reduced as much as possible (to be half or less). As a result, the waste caused by the cutting of the formed weld beads 63 can be reduced, and the cost can be reduced.

Figure 7A:
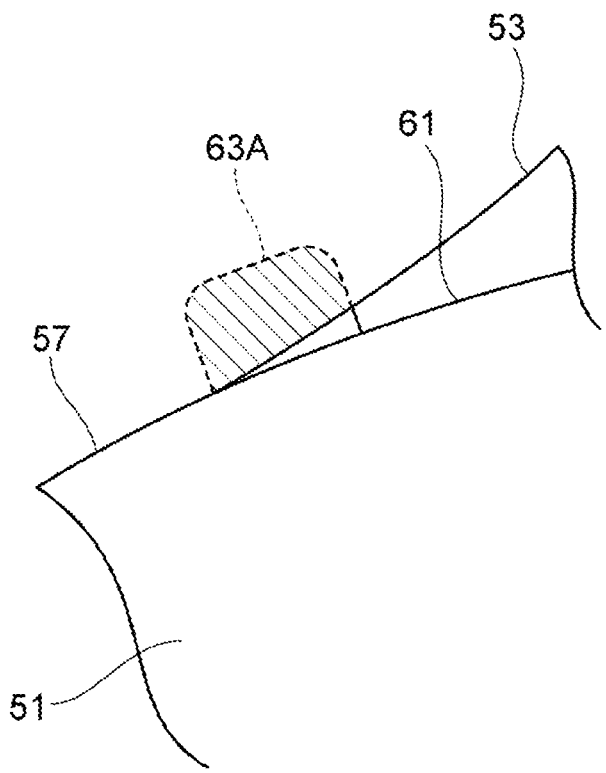
FIG. 7A is a schematic view for illustrating cutting of an edge portion at a root of a blade in the case where a maximum cutting dimension T is set as T=0.
Figure 7B:
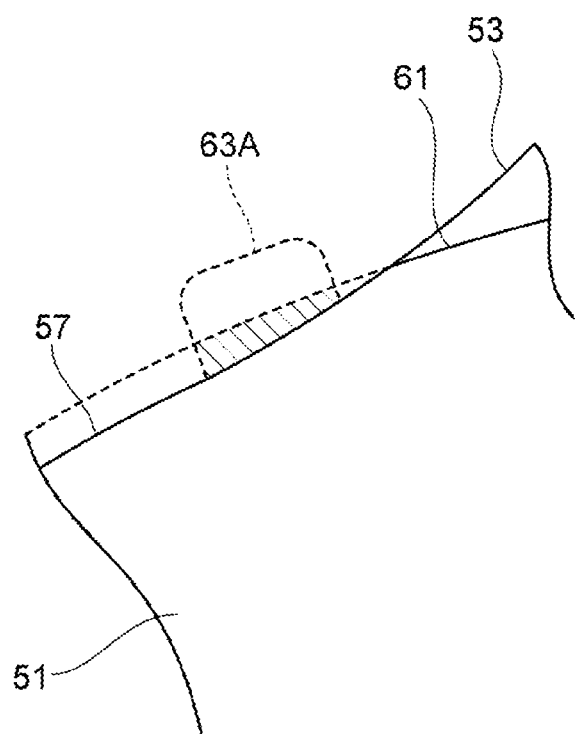
FIG. 7B is a schematic view for illustrating cutting of the edge portion at the root of the blade in the case where the maximum cutting dimension T is set as T=½H.

Here, a comparative investigation will be made as to an edge portion at a root of each blade 53 in the case where T=0 and the case where T=½H. In the case where T=0, as shown in FIG. 7A, the base material 61 is not cut. As a result, a weld bead 63A is built in order to form a portion to serve as the edge portion at the root of the blade 53. The weld bead 63A is cut substantially all over its region (hatched part in FIG. 7A) except a part thereof. On the other hand, in the case where T=½H, as shown in FIG. 7B, a part of the base material 61 is cut to form the portion to serve as the edge portion at the root of the blade 53. In this case, at the position where the weld bead 63A to be built in the case where T=0 is built, the region to be cut can be reduced to be substantially half as small as that (hatched portion in FIG. 7B) in the case where T=0. In this manner, in the case where the maximum cutting dimension of the base material 61 is set to satisfy T≥½H, it is sufficient to cut only a part (hatched portion in FIG. 7B) of the base material 61. Thus, the cutting amount of the weld bead 63A can be reduced (approximately to half or less).

In addition, the embodiment satisfies R1≥R0+H where R0 designates the radius of the bottom portion circle 67, and R1 designates the radius of the base material 61. Accordingly, when the built-up object W is manufactured, the base material 61 can be selected easily so that the waste caused by the cutting of the weld beads 63 in the cutting step can be reduced as much as possible.

Figure 8:
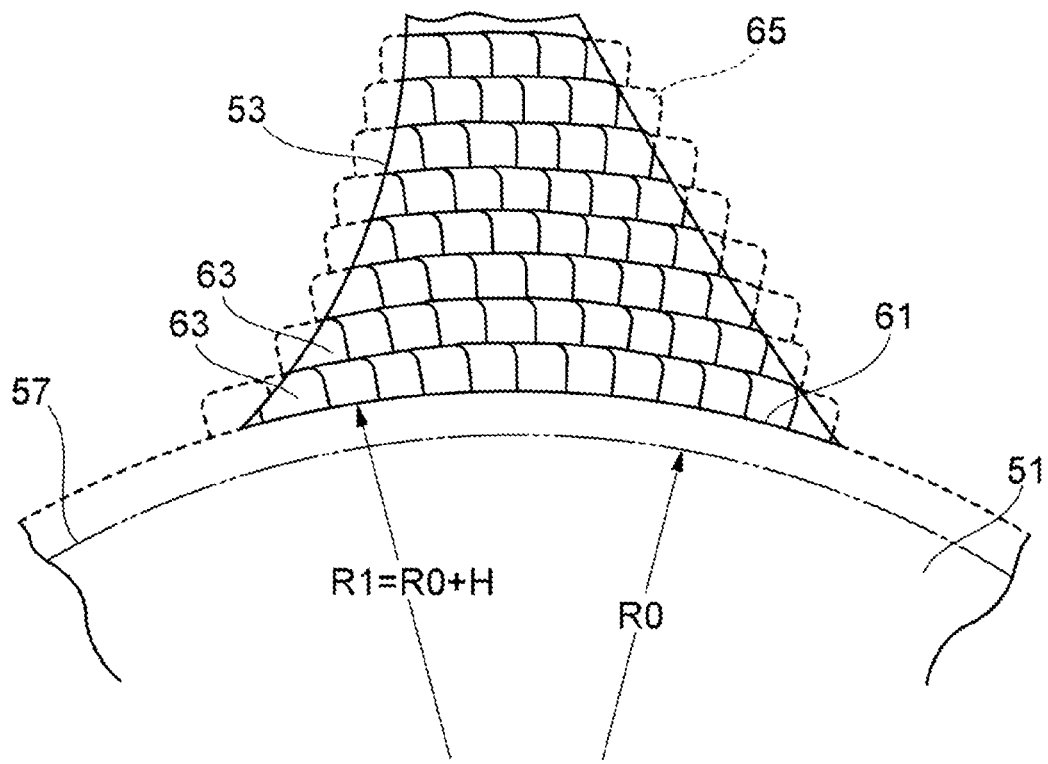
FIG. 8 is a schematic sectional view for illustrating a welding amount and a cutting amount of weld beads in the case where a radius R1 of the base material is set as R1=R0+H.
Figure 9:
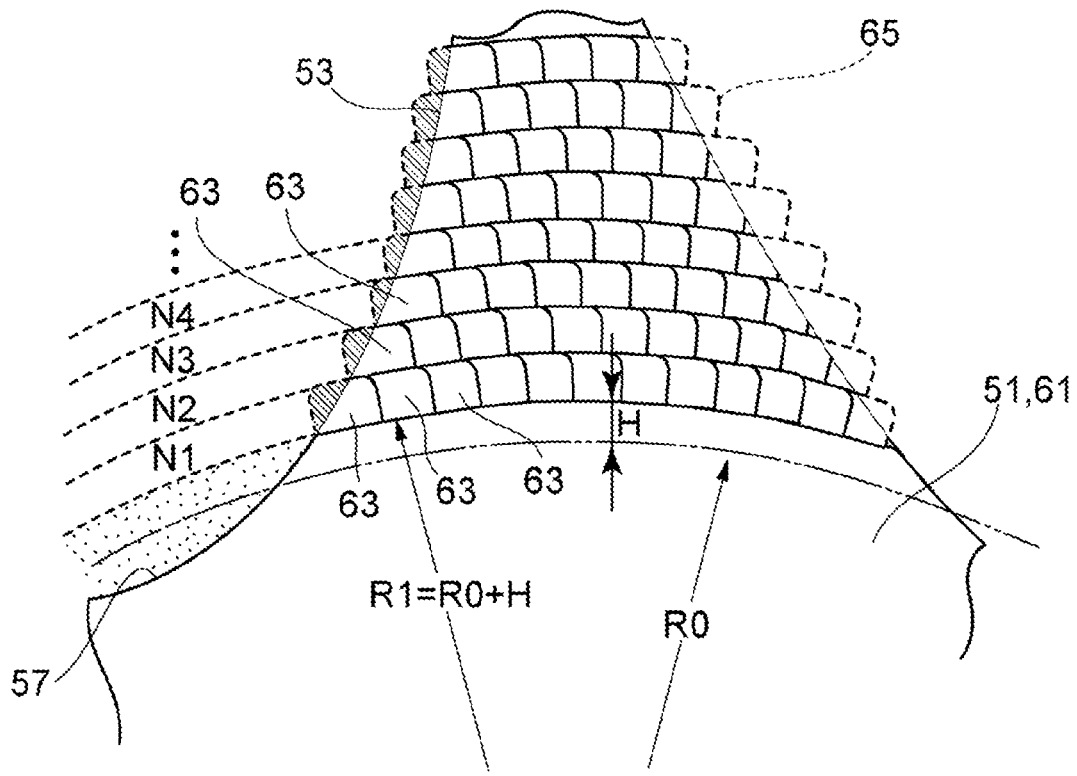
FIG. 9 is an explanatory view showing a relation between a cutting amount of the base material and a cutting amount of a built-up portion.

Here, investigation will be made as to the welding amount and the cutting amount of the weld beads 63 in the case where R1=R0 and the case where R1=R0+H. As shown in FIG. 8, in the case where the radius R1 of the base material 61 is set to satisfy R1=R0+H, the number of layers of the weld beads 63 required for forming each of the built-up portions 65 to serve as the blades 53 can be reduced by one layer in comparison with the case where R1=R0 (see FIG. 6A). Accordingly, the welding amount of the weld beads 63 required for forming the built-up portion 65 and the cutting amount of the weld beads 63 can be reduced. That is, the welding amount and the cutting amount of the weld beads 63 are reduced as long as the radius R1 of the base material 61 is set to satisfy R1≥R0+H. In addition, as shown in FIG. 9, if the radius R1 of the base material 61 is increased to R0+2H, R0+3H and R0+4H, it is necessary to cut portions such as N1, N2, N3, . . . , which originally do not have to be cut. Therefore, from the viewpoint of balance for the material yield, it is preferable to make the cutting amount of the base material 61 smaller than the cutting amount of the built-up portion 61.

In the built-up object W to be manufactured by the manufacturing method according to the embodiment, parts of the shaft body 51 in the concave portions 57 are cut together with the built-up portions 65 where the weld beads 63 have been deposited. Accordingly, in the built-up object W, the weld beads 63 can be built easily, and the waste caused by the cutting of the weld beads 63 in forming the concave portions 57 can be reduced as much as possible. In addition, the welding amount of the weld beads 63 can be reduced so that the lowering of the accuracy caused by welding deformation due to a large welding amount of the weld beads 63 can be inhibited to improve the accuracy.

The present invention is not limited to the aforementioned embodiment, but configurations of the embodiment may be combined with one another. In addition, changes or applications made by a skilled person in the art based on the present description and common techniques are also intended by the present invention. Such combinations and changes or applications are also included in the scope of protection sought.

For example, in the aforementioned embodiment, the case where the cutting robot 41 includes the metal processing tool 45 in the tip arm 43 of the articulated robot is used as the cutting unit 12 for cutting the built-up object W is shown as an example. However, the cutting unit 12 other than the cutting robot 41 can be used. A cutting machine such as a five-axis processing machine or a dedicated processing machine for a rotor (gear cutting machine) may be used as the cutting unit 12.

The following items are disclosed in the present description as described above.

(1) A method for manufacturing a built-up object, in which the built-up object includes a plurality of blades provided around a shaft body at circumferential intervals, and concave portions provided between adjacent ones of the blades, each of the concave portions having a curved shape in a section perpendicular to an axial direction, the method including:

a building step of depositing weld beads obtained by melting and solidifying a filler material on a circumferential surface of a base material having a circular shape in a sectional view and having a larger radius than a bottom portion circle passing through bottom portions of the concave portions, thereby forming built-up portions to serve as the blades; and a cutting step of cutting parts of surfaces of the built-up portions and the circumferential surface of the base material, thereby forming the blades and the concave portions between the blades.

In the method for manufacturing a built-up object, parts of the base material are cut for forming the concave portions. Accordingly, the region where the weld beads are formed for forming a root portion having a gently curved shape in each blade can be made as narrow as possible. Thus, the time required for the building step of forming the weld beads can be shortened.

In addition, the weld beads formed in a gentle portion of each concave portion can be made as small as possible. Thus, the waste caused by cutting of a large part of the weld beads can be reduced as much as possible. In addition, the welding amount of the weld beads can be reduced so that the lowering of the accuracy caused by welding deformation due to a large welding amount of the weld beads can be inhibited to improve the accuracy.

(2) The method for manufacturing a built-up object according to (1), satisfying $$T \geq \tfrac{1}{2}H$$

in which H designates a height of the weld beads, and T designates a maximum cutting dimension in a radial direction of the base material.

In the method for manufacturing a built-up object, in the cutting step, the cutting amount of the weld beads formed on the base material can be reduced as much as possible (to be half or less). As a result, the waste caused by the cutting of the formed weld beads can be reduced to reduce the cost.

(3) The method for manufacturing a built-up object according to (2), satisfying $$R1 \geq R0 + H$$

in which R0 designates a radius of the bottom portion circle, and R1 designates a-radius of the base material.

In the method for manufacturing a built-up object, when the built-up object is manufactured, the number of layers of the weld beads can be reduced to reduce the welding amount of the weld beads. In addition, the base material can be selected easily such that the waste caused by the cutting of the weld beads in the cutting step can be reduced as much as possible.

(4) The method for manufacturing a built-up object according to any one of (1) to (3), in which a cutting amount of the base material is smaller than a cutting amount of the built-up portions.

The method for manufacturing a built-up object can prevent unnecessary cutting of the base material, so that building can be performed at high efficiency with balance for the material yield.

(5) A built-up object including a shaft body, a plurality of blades provided around the shaft body at circumferential intervals, and concave portions provided between adjacent ones of the blades, each of the concave portions having a curved shape in a section perpendicular to an axial direction, in which the blades are formed out of built-up portions formed by depositing weld beads obtained by melting and solidifying a filler metal, in which parts of the shaft body in the concave portions are cut together with the built-up portions.

The built-up object can be configured so that the weld beads can be built easily, and the waste caused by cutting of the weld beads when the concave portions are formed can be reduced as much as possible. In addition, the welding amount of the weld beads can be reduced so that the lowering of the accuracy caused by welding deformation due to a large welding amount of the weld beads can be inhibited to improve the accuracy.

This application is based on Japanese Patent Application No. 2018-50029 filed on Mar. 16, 2018, the entire subject matter of which is incorporated herein by reference.

REFERENCE SIGNS LIST 51 shaft body
53 blade
55 rotor
57 concave portion
61 base material
63 weld bead
65 built-up portion
67 bottom portion circle
H height of weld bead
M filler metal
R0 radius of bottom portion circle
R1 radius of base material
T maximum cutting dimension
W built-up object

The invention claimed is:

1. A method for manufacturing a built-up object, wherein the built-up object includes a plurality of blades provided around a shaft body at circumferential intervals, and concave portions provided between adjacent ones of the blades, each of the concave portions having a curved shape in a section perpendicular to an axial direction, the method comprising:

a building step of depositing weld beads obtained by melting and solidifying a filler material on a circumferential surface of a base material having a circular shape in a sectional view, thereby forming built-up portions to serve as the blades; and a cutting step of cutting parts of surfaces of the built-up portions and the circumferential surface of the base material, thereby forming the blades and the concave portions between the blades, wherein, after the cutting step, the base material has a larger radius than a bottom portion circle contacting bottom portions of the concave portions in the sectional view, and wherein $T \geq \frac{1}{2}H$, where H designates a height of at least one of the weld beads, and T designates a maximum cutting dimension in a radial direction of the base material.

2. The method for manufacturing a built-up object according to claim 1, satisfying $$R1 \geq R0 + H$$

wherein R0 designates a radius of the bottom portion circle, and R1 designates a radius of the base material.

3. The method for manufacturing a built-up object according to claim 2, wherein a cutting amount of the base material is smaller than a cutting amount of the built-up portions.

4. The method for manufacturing a built-up object according to claim 1, wherein a cutting amount of the base material is smaller than a cutting amount of the built-up portions.

5. The method for manufacturing a built-up object according to claim 1, wherein a cutting amount of the base material is smaller than a cutting amount of the built-up portions.

6. A built-up object comprising a shaft body, a plurality of blades provided around the shaft body at circumferential intervals, and concave portions provided between adjacent ones of the blades, each of the concave portions having a curved shape in a section perpendicular to an axial direction, wherein the blades are formed out of built-up portions formed by depositing weld beads obtained by melting and solidifying a filler metal on a circumferential surface of a base material having a circular shape in a sectional view, wherein parts of the shaft body in the concave portions are cut together with the built-up portions, the base material has a larger radius than a bottom portion circle contacting bottom portions of the concave portions in the sectional view, and wherein $T \geq \frac{1}{2}H$, where H designates a height of at least one of the weld beads, and T designates a maximum cutting dimension in a radial direction of the base material.

* * * * *